United States Patent [19]
Young

[11] Patent Number: 4,776,442
[45] Date of Patent: Oct. 11, 1988

[54] FLYWHEEL SLIP CLUTCH

[75] Inventor: Robert G. Young, Bird-in-Hand, Pa.

[73] Assignee: Ford New Holland, Inc., New Holland, Pa.

[21] Appl. No.: 20,810

[22] Filed: Mar. 3, 1987

[51] Int. Cl.[4] ................................................. F16D 7/02
[52] U.S. Cl. ................................... 192/56 R; 464/46; 74/572
[58] Field of Search ................ 192/48.3, 56 R, 30 W; 464/41, 45, 46; 74/572; 100/189

[56] References Cited

U.S. PATENT DOCUMENTS

| | | | |
|---|---|---|---|
| 1,407,384 | 2/1922 | Crowley, Jr. | 192/56 R |
| 2,753,703 | 7/1956 | McIntyre | 464/46 X |
| 2,801,535 | 8/1957 | Corkery | 464/46 |
| 2,939,301 | 6/1960 | Huddle | 192/30 W X |
| 3,457,733 | 7/1969 | Bargerter et al. | 464/46 X |
| 3,775,998 | 12/1973 | Century et al. | 464/46 |
| 4,241,654 | 12/1980 | Van der Lely | 100/189 |
| 4,445,876 | 5/1984 | Entrup | 464/48 |

FOREIGN PATENT DOCUMENTS 197710 10/1977 U.S.S.R. .............................. 192/48.3

Primary Examiner—Rodney H. Bonck
Assistant Examiner—Richard M. Lorence
Attorney, Agent, or Firm—Darrell F. Marquette; Frank A. Seemar; Larry W. Miller

[57] ABSTRACT

A flywheel slip clutch is provided for use with implements such as agricultural balers. The flywheel slip clutch includes a plate mounted on a hub which is fixed to rotate with the input drive shaft of an implement. The plate is connected to the PTO drive line and clutch of a tractor. A flywheel is rotatably mounted on the hub, and a friction disc is interposed between annular surfaces of the plate and the flywheel. During normal operation, the torque from the tractor PTO drive line and the torque generated by the flywheel are delivered to the input shaft of the implement. In the event of an overload condition on the implement input shaft, the tractor PTO clutch disengages and the flywheel spins out disengaging itself from the friction disc which is connected to the plate. This prevents damage to the implement without utilizing a shearbolt between the flywheel and the hub.

6 Claims, 3 Drawing Sheets

FLYWHEEL SLIP CLUTCH

BACKGROUND AND SUMMARY OF THE INVENTION

This invention relates to a flywheel slip clutch for preventing damage to an implement, such as an agricultural baler.

Current practice in agricultural balers is illustrated in FIG. 3 where a flywheel a is rotatably mounted on the input shaft b of the transmission gearbox c. A hub d is fixed to the end of the gearbox input shaft b by splines, and the hub d and flywheel a are connected together by a shearbolt e designed to fail at a preselected torque limit. The tractor PTO drive line f and clutch g are typically connected directly to the flywheel a so that the tractor PTO torque is routed through the PTO drive line f and clutch g to the flywheel a, then through the shearbolt e to the hub d, and then into the gearbox input shaft b. This method while effective has some drawbacks. For example, the shearbolt failure torque must be high enough to prevent nuisance failures of the shearbolt e. The shearbolt e is subject to fatigue failures from repeated cycles of loading. When an overload condition occurs causing failure of the shearbolt e, the operator must shutdown operation of the baler in order to replace the shearbolt e and frequently must manually clear out the feeder to prevent an additional shearbolt failure due to the overload condition. The shearbolt e does not typically give any warning or indication that an overload condition is being approached.

The present invention eliminates the shearbolt e in a manner that causes the tractor PTO drive line f and the flywheel a to be additive in torque. This reduces the amount of torque required from the flywheel a while still providing adequate torque to the input shaft b of the transmission gearbox c. In operation, the torque available to the gearbox input shaft b from the flywheel a can be lower because shearbolts must be designed to fail at a high enough torque to prevent nuisance failures. The present invention also gives advance warning of impending overload conditions by the flywheel a starting to slip out before the tractor PTO clutch g disengages. This advance warning and the elimination of the necessity to shutdown operation to replace a shearbolt gives operators confidence to operate balers at a higher capacity.

The present invention provides a flywheel slip clutch for connecting a flywheel to an input drive shaft of an implement. The flywheel slip clutch comprises a plate connected to rotate the input drive shaft and adapted for connection to a tractor PTO drive line and clutch, the flywheel being rotatably mounted on the input drive shaft, and friction means interposed between the plate and the flywheel for drivingly engaging and disengaging the plate and the flywheel. In the event of an overload condition on the input drive shaft, the plate and the flywheel are drivingly disengaged and the tractor PTO clutch also disengages. In order to provide warning of an impending overload condition, the plate and the flywheel start to drivingly disengage before the tractor PTO clutch disengages.

DESCRIPTION OF THE PREFERRED EMBODIMENT

Figure 1:
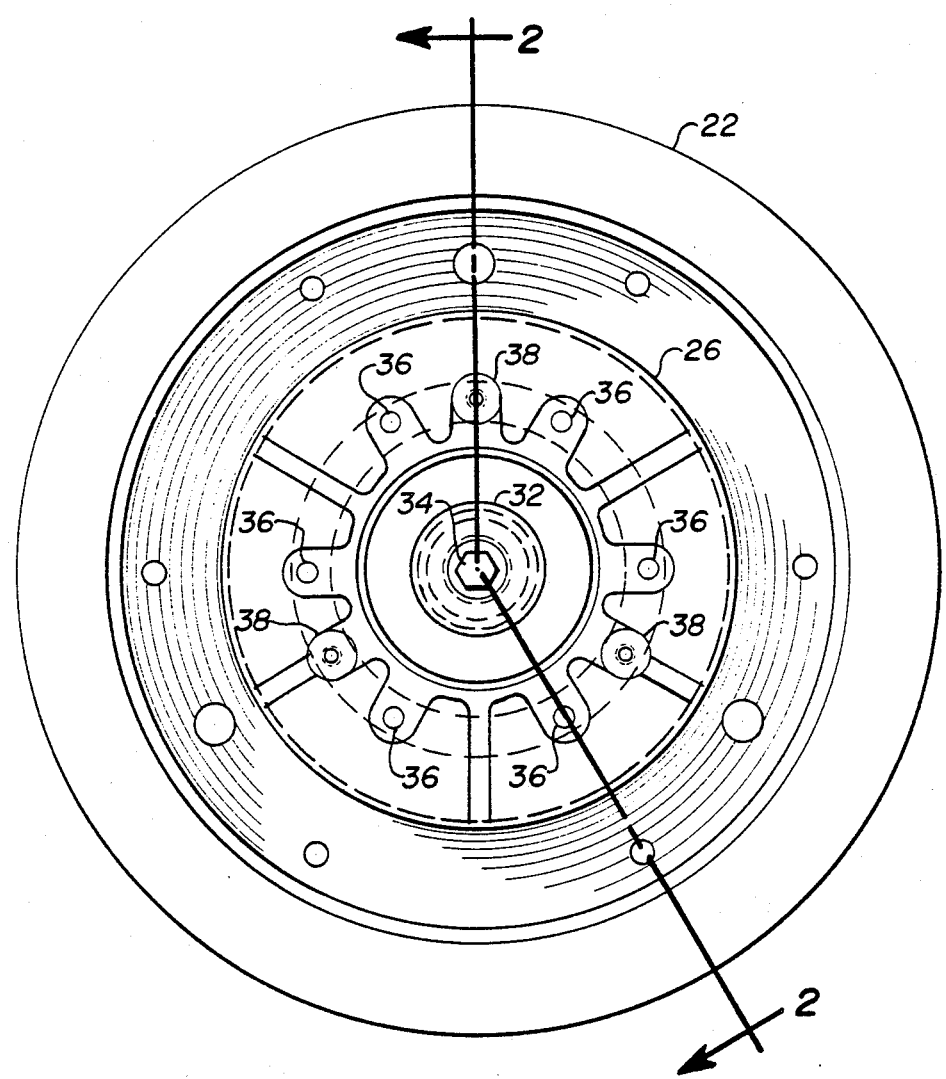
FIG. 1 is a front elevational view of a flywheel slip clutch according to the present invention.
Figure 2:
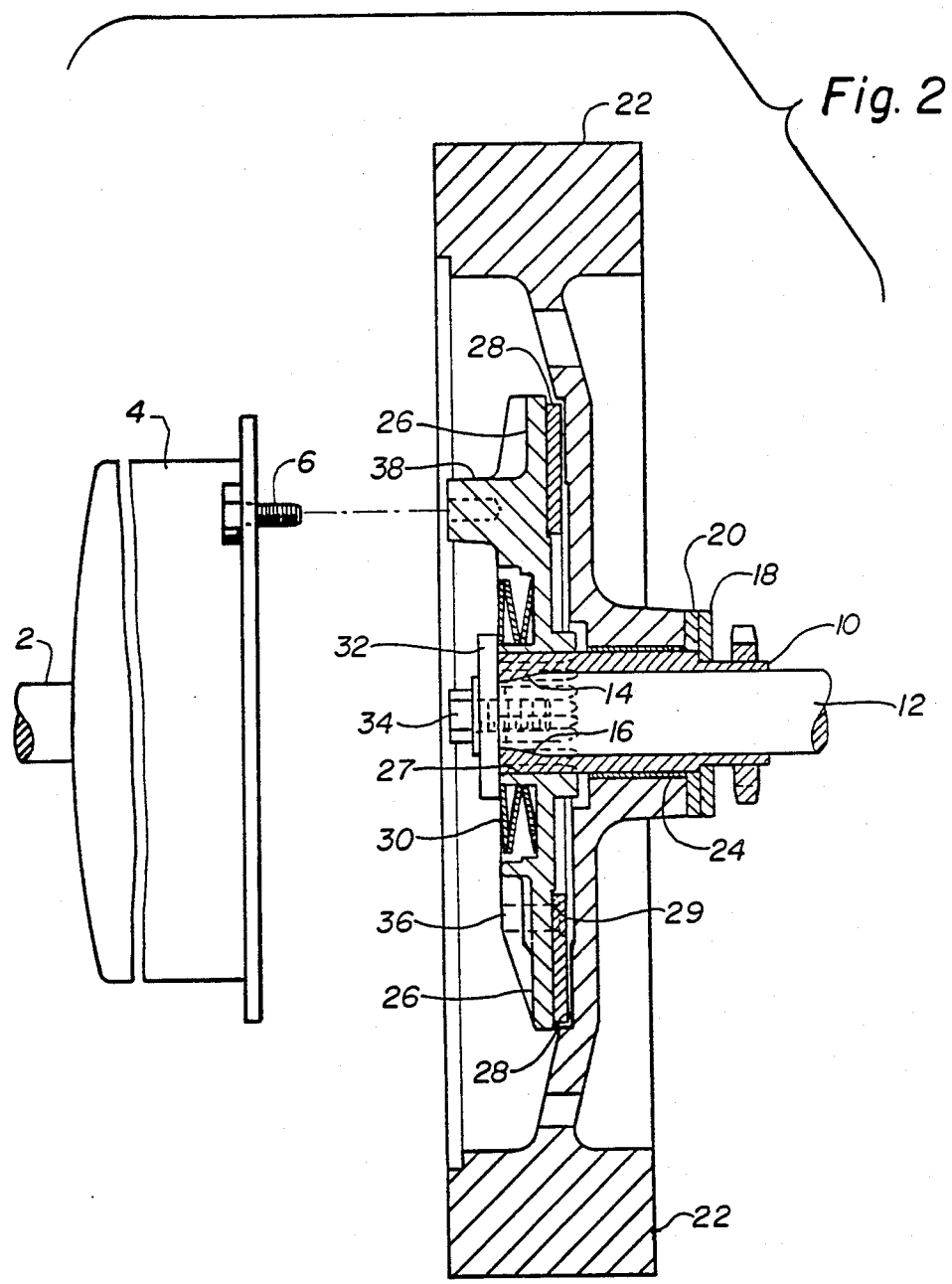
FIG. 2 is a sectional view taken along lines 2—2 in FIG. 1.
Figure 3:
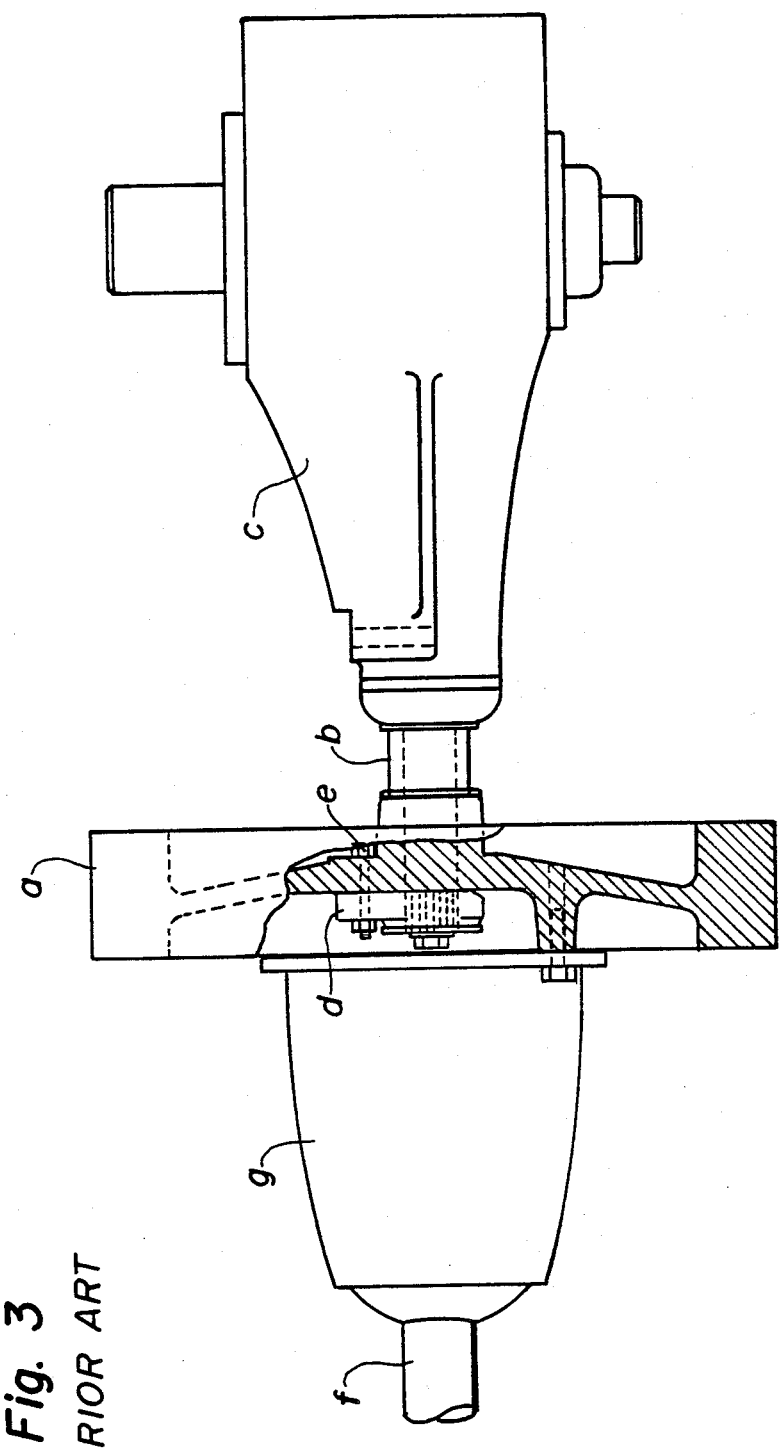
FIG. 3 is a partial sectional view illustrating a prior art arrangement.

Referring to FIGS. 1 and 2, a flywheel slip clutch includes a hub 10 fitted on an input drive shaft 12 of an implement such as a baler. Internal tapered splines 14 on the hub 10 engage external tapered splines 16 on the input shaft 12 to prevent rotational movement between the hub 10 and the shaft 12. An abutment is provided by washer 18 which is welded to the hub 10 and a heat treated washer 20 is adjacent washer 18 to reduce wear. A flywheel 22 is rotatably mounted on the hub 10 by a sleeve 24. A plate 26 is also mounted on the hub 10. The plate 26 engages the hub 10 through straight splines 27 which permit axial movement of the plate 26 on the hub 10 while preventing rotational movement of the plate 26 on the hub 10.

A friction disc 28 is interposed between annular surfaces of the plate 26 and the flywheel 22. A stack of Belleville springs 30 is axially piloted on the plate 26. Washer 32 is then tightened against the Belleville springs 30 by bolt 34 to provide axial load against the plate 26. Six pins 36 are pressed into the plate 26 and provide a drive connection through the plate 26 into the plate 26 into the friction disc 28 via six aligned holes 29 in the disc 28. The axial load provided against the plate 26 by the Belleville springs 30 is transmitted to the flywheel 22 via the friction disc 28. There is no relative rotational movement between the Belleville springs 30 and the washer 32 or plate 26.

The standard tractor PTO drive line 2 and clutch 4 are attached in conventional manner by bolts 6 to three bosses 38 provided on the plate 26. The torque delivered to the input shaft 12 by the flywheel 22 may be varied by choosing the desired number of Belleville springs 30. The PTO drive line torque goes directly to the plate 26 and into the input shaft 12 via the hub 10. The torque produced by the flywheel 22 also goes into the shaft 12 via the friction disc 28, plate 26, and the hub 10.

During normal operation, the total torque delivered to the input shaft 12 is a first amount of torque delivered from the tractor PTO drive line 2 via the plate 26 plus a second amount of torque supplied by the flywheel 22 via the plate. This arrangement reduces the second amount of torque that is required from the flywheel 22 while still providing adequate total torque to the input shaft 12.

In the event of an overload condition on the input shaft 12 such as caused by an obstruction in the baler, the tractor PTO clutch 4 disengages and the flywheel 22 spins out drivingly disengaging itself from the friction disc 28 which is connected to the plate 26 by pins 36. The operator then drivingly disconnects the tractor PTO drive line 2 from the tractor and clears the obstruction either manually or by drivingly reconnecting the tractor PTO drive line 2 to restart the baler.

When a baler is operated at a relatively high capacity such as in heavy windrows of crop material, the flywheel 22 will start to spin out and slip on the friction disc 28 before the tractor PTO clutch 4 disengages. This gives the operator an audible warning of an impending overload condition when the baler starts to slow down and thus gives him an opportunity to reduce the baler capacity by reducing the ground speed of the baler in order to prevent the tractor PTO clutch from disengaging. Since the operator does not have to be concerned with shearbolt failures when using the flywheel slip clutch of the present invention, balers may be operated at a higher capacity than if shearbolts were used.

Having thus described the invention, what is claimed is:

1. A flywheel slip clutch for connecting a flywheel to an input drive shaft of an implement, said flywheel slip clutch comprising:

a plate connected to rotate said input drive shaft and adapted for connection to a tractor PTO drive line so that said tractor PTO drive line delivers a first amount of torque to said input drive shaft via said plate;

said flywheel being rotatably mounted on said input drive shaft;

a friction disc connected to said plate for contacting said flywheel for drivingly engaging said plate and said flywheel so that said flywheel supplies a second amount of torque to said input drive shaft via said plate; and said friction disc permitting said flywheel to slip relative to said plate in the event of an overload condition on said input drive shaft.

2. The flywheel slip clutch of claim 1, wherein said friction disc is connected to said plate by a plurality of pins.

3. The flywheel slip clutch of claim 1, further comprising spring means for normally urging said plate and said friction means toward said flywheel.

4. The flywheel slip clutch of claim 3, wherein said spring means comprises Belleville springs.

5. The flywheel slip clutch of claim 1, further comprising a hub splined on the input drive shaft, said plate being splined on said hub, and said flywheel being rotatably mounted on said hub.

6. The flywheel slip clutch of claim 5, wherein said plate has a plurality of bosses to which the tractor PTO drive line may be connected.

* * * * *

UNITED STATES PATENT AND TRADEMARK OFFICE
CERTIFICATE OF CORRECTION

PATENT NO. : 4,776,442
DATED : October 11, 1988
INVENTOR(S) : Tsutomu Sakuma

It is certified that error appears in the above-identified patent and that said Letters Patent is hereby corrected as shown below:

```
Column 1, line 52, correct the spelling of --undesirable--;
          line 53, change "fron" to --from--.
Column 2, line 27, change "motor cycle" to --motorcycle--.
Column 3, line 5, after "according" insert --to--;
          line 21, correct the spelling of --substantially--;
          line 28, change "FIG." to FIGS--.
Column 4, line 65 (claim 1, line 1), change "a" to --A--.
Column 5, line 5 (claim 1, line 9), change "a" to --an--;
          line 40 (claim 7, line 1), change "a" to --A--.
Column 6, line 19 (claim 7, line 25), after "respectively" insert --and--
          line 40 (claim 12, line 1), before "motorcycle" insert --A--.

In the Abstract, line 14, after "pipes (first occurrence)
insert --have--.
```

Signed and Sealed this

Eleventh Day of April, 1989

Attest:

DONALD J. QUIGG

Attesting Officer

Commissioner of Patents and Trademarks